US012195317B2

(12) United States Patent
Poeschl

(10) Patent No.: US 12,195,317 B2
(45) Date of Patent: Jan. 14, 2025

(54) DEVICE AND METHOD FOR FILLING A CONTAINER WITH A FILLING PRODUCT

(71) Applicant: KRONES AG, Neutraubling (DE)

(72) Inventor: Stefan Poeschl, Neutraubling (DE)

(73) Assignee: KRONES AG, Neutraubling (DE)

( * ) Notice: Subject to any disclaimer, the term of this patent is extended or adjusted under 35 U.S.C. 154(b) by 454 days.

(21) Appl. No.: 17/518,915

(22) Filed: Nov. 4, 2021

(65) Prior Publication Data

US 2022/0135388 A1     May 5, 2022

(30) Foreign Application Priority Data

Nov. 5, 2020 (DE) ..................... 10 2020 129 149.3

(51) Int. Cl.
| | |
|---|---|
| *B67C 3/28* | (2006.01) |
| *B67C 3/00* | (2006.01) |
| *B67C 3/20* | (2006.01) |
| *G05D 7/06* | (2006.01) |

(52) U.S. Cl.
CPC .............. *B67C 3/286* (2013.01); *B67C 3/007* (2013.01); *B67C 3/204* (2013.01); *B67C 3/287* (2013.01); *G05D 7/0617* (2013.01)

(58) Field of Classification Search
CPC .. B67C 3/007; B67C 3/04; B67C 3/22; B67C 3/26; B67C 3/28; B67C 3/286; B67C 3/287; B67C 3/204; G05D 7/06; G05D 7/0617

See application file for complete search history.

(56) References Cited

U.S. PATENT DOCUMENTS

| | | | | |
|---|---|---|---|---|
| 6,530,402 | B2* | 3/2003 | Suzuki .................. | G01F 15/003 |
| | | | | 141/234 |
| 10,017,369 | B2* | 7/2018 | D'Errico ............... | G01F 1/3259 |
| 11,142,443 | B2* | 10/2021 | Clüsserath ............... | B67C 3/12 |

(Continued)

FOREIGN PATENT DOCUMENTS

| | | |
|---|---|---|
| CN | 111333002 A | 6/2020 |
| DE | 102005035264 | 2/2007 |

(Continued)

OTHER PUBLICATIONS

Machine translation of DE10205035264; Apr. 12, 2018; all pages (Year: 2018).*

(Continued)

*Primary Examiner* — Nicolas A Arnett
(74) *Attorney, Agent, or Firm* — Haynes and Boone, LLP

(57) ABSTRACT

A device and method for filling a container with a filling product, for example in a beverage bottling installation, wherein the device has: at least one filling valve which is configured to introduce the filling product into the container; at least one flowmeter which is connected to the filling valve via a product conduit and which is configured to ascertain a filling product quantity passing the flowmeter in the product conduit; and a controller which communicates with the filling valve and with the flowmeter and which is configured to control the filling valve during the filling process; characterized in that the controller communicates bidirectionally with the flowmeter and is configured to perform a parameterization of the flowmeter in a manner dependent on one or more filling process variables.

19 Claims, 4 Drawing Sheets

(56) References Cited

U.S. PATENT DOCUMENTS

| | | | | |
|---|---|---|---|---|
| 11,655,132 B2* | 5/2023 | Poeschl | ................ | B67C 3/2617 |
| | | | | 53/267 |
| 2020/0189898 A1* | 6/2020 | Theopold | ........... | G05B 23/0235 |
| 2020/0346911 A1* | 11/2020 | D'Errico | ................ | B67C 3/286 |
| 2021/0356305 A1* | 11/2021 | Dalberg | ................ | G01F 1/688 |

FOREIGN PATENT DOCUMENTS

| | | |
|---|---|---|
| DE | 102018130652 | 6/2020 |
| DE | 102018130652 A1 | 6/2020 |
| EP | 3683185 A1 | 7/2020 |

OTHER PUBLICATIONS

BAUMER Passion for Sensors; "Efficient flow measurement, Magnetic inductive flow meters, CombiFlow and FlexFlow flow sensors"; Technische Änderungen und Irrtum Vorbehalten 04/20 Nr. 1 1230083; 13 pages.

Extended European Search Report for EP application No. 21206665.8 dated Apr. 29, 2022, 8 pages.

Search Report issued in DE 10 2020 129 149.3; Sep. 9, 2021; 6 pages.

Chinese Office Action dtd Apr. 2, 2024 for CN Application No. 202111305533.7, 10 pages.

IYJT, Operations Instructions of an Electromagnetic Flowmeter, Jan. 7, 2016, 37 pages.

\* cited by examiner

DEVICE AND METHOD FOR FILLING A CONTAINER WITH A FILLING PRODUCT

CROSS-REFERENCE TO RELATED APPLICATIONS

This application claims priority from German Patent Application No. DE 10 2020 129 149.3, filed on Nov. 5, 2020 in the German Patent and Trademark Office, the disclosure of which is incorporated herein by reference in its entirety.

BACKGROUND

Technical Field

The present invention relates to a device and to a method for filling a container with a filling product, for example in a beverage bottling installation.

Related Art

Filling elements of a variety of types are known for the bottling of filling products, for example of beverages in a beverage bottling installation. The flow of the filling product through the filling element and thus the introduction into a container is normally controlled by means of a filling valve which comprises a valve cone which is seated in a valve receptacle of complementary shape with respect to the valve cone. The filling process is thus started by virtue of the valve cone being lifted out of the valve receptacle or out of the valve seat, and the filling process is ended again by virtue of the valve cone subsequently being lowered onto the valve seat.

In order to be able to continuously variably control the filling volume flowing into the container and correspondingly adhere to volume flow curves that are optimized in accordance with the filling product and process environment, proportional valves which allow substantially continuously variable control of the volume flow can be used as filling valves. By contrast to shut-off valves, which can assume only the two states of open or closed, proportional valves can be controlled such that a continuous or quasi-continuous spectrum of opening positions can be reliably and reproducibly set. For this purpose, proportional valves are commonly actuated by means of a stepper motor, whereby, owing to the design, even valves with a discrete spectrum of opening positions with small intervals fall under the term "proportional valves".

It is furthermore known to use a flowmeter to ascertain the volume flow flowing into the container to be filled during the filling process, for example in order to determine the end of the filling process or to generally ensure that the intended filling curve is followed. Here, the flowmeter is typically arranged above the filling valve and measures the volume flow flowing into the container during the filling process. At present, inductive flowmeters and mass flowmeters are used in the filling technology sector. In the case of the inductive flowmeter, the volume flow is ascertained from the flow speed in a defined cross section by virtue of a variable electromagnetic field being applied perpendicularly with respect to the flow direction of the product, which results in a charge separation of charge carriers present in the liquid, such as ions. The voltage that arises as a result of the charge separation is proportional to the flow speed of the charge carriers and can be measured in order to determine the volume flow.

The measurement accuracy of the flowmeter is dependent inter alia on the composition and flow speed of the filling product. The working range of the flowmeter, field strength, sampling rate and other parameters have hitherto been set to be the best possible for the measurement range as a whole. As a result, the parameterization of the flowmeter is not optimal for all filling products and bottling speeds, but constitutes a compromise. This also applies to flowmeters of other types, for example for the abovementioned mass flowmeter, the parameterization of which must possibly likewise cover a large process range.

SUMMARY

The present disclosure provides a device and a method to improve the filling of a container with a filling product, in particular to increase the bottling accuracy and the reliability of the bottling process.

The device and the method according to embodiments of the invention serve for filling containers with a filling product. They are, in one embodiment, used in a beverage bottling installation, for example for the bottling of water (carbonated or still), beer, wine, juice, soft drinks, smoothies, milk products and the like.

The device according to one embodiment of the invention comprises at least one filling valve which is configured to introduce the filling product into the container, and at least one flowmeter which is connected to the filling valve via a product conduit and which is configured to ascertain a filling product quantity passing the flowmeter in the product conduit. For this purpose, the flowmeter may measure the volume flow, the transported mass or some other physical variable that is a measure for the throughflowing fluid quantity. The flowmeter, in one embodiment, operates in contactless fashion, as in the case of the inductive type.

The product conduit draws the filling product, in some embodiments, out of a filling product reservoir, to which the product conduit is in this case connected. The filling product reservoir may be implemented in the form of a central vessel or annular vessel and may be arranged on a filling carousel so as to rotate therewith. Alternatively, the filling product reservoir may also be a vessel provided nearby, for example in the region of the filling machine.

The device furthermore has a controller which communicates, wirelessly or in wired fashion, with the filling valve and with the flowmeter and which is configured to control the filling valve during the filling process, that is to say in particular during the introduction of the filling product into the container. In the simple case of a filling valve in the form of a shut-off valve, the control is implemented for example by means of a time-dependent signal which causes the filling valve to open or to close the corresponding passage of the product conduit. In the case of a proportional valve, the control generally comprises further information items that characterize the opening state that the filling valve is intended to assume.

According to an embodiment of the invention, the controller communicates bidirectionally with the flowmeter and is configured to perform a parameterization of the flowmeter in a manner dependent on one or more filling process variables. Here, "bidirectionally" means that not only can measurement data be transmitted, in processed or unprocessed form, from the flowmeter to the controller, for example for the open-loop or closed-loop control of the further filling process, but the controller can also transmit information to the flowmeter. These signals, commands or the like from the controller to the flowmeter serve for the parameterization of the flowmeter, that is to say for the change of one or more parameters that influence the mode of operation of the flowmeter, in particular for the adaptation or optimization of the measurement range of the flowmeter. Note here that the parameterization originates from or is performed by that controller which serves for controlling the filling valve.

By means of such bidirectional communication between the flowmeter and the controller of the filling valve and the parameterization of the flowmeter by means of said controller, the working range of the flowmeter can be optimally set to the present bottling situation, for example to the filling product, the bottling quantity, bottling speed or more generally the filling curve. In this way, the bottling accuracy and reliability of the device can be improved, because the parameterization is changed dynamically by the controller and therefore does not need to be set in advance as a compromise for different bottling situations.

The dynamic parameterization of the flowmeter as presented above may optionally also be performed by the controller indirectly, by virtue of communication between the filling valve and the flowmeter being implemented such that the filling valve transmits its state to the flowmeter, which can thereupon adapt its parameters or its measurement range to the opening state of the filling valve. Such indirect parameterization is likewise encompassed by the claimed bidirectional communication.

The controller is, in certain embodiments, configured to perform the parameterization of the flowmeter during the filling process, for example during the introduction of the filling product into the container. The working range of the flowmeter can thus be optimally adapted to the present conditions even while adhering to a filling curve, whereby the bottling accuracy is further improved.

In several embodiments, the one or more filling process variables comprise a control variable for the control of the filling valve and/or one or more filling product characteristics, such as the viscosity of the filling product and/or the Brix content of the filling product and/or the fruit fibre content of the filling product and/or the pulp content. Taking into consideration filling product characteristics and/or a control variable that indicates the opening state of the filling valve, the parameterization of the flowmeter can be adjusted particularly accurately to the present bottling situation.

The filling valve is, in certain embodiments, a proportional valve. The proportional valve may optionally be supplemented by a shut-off valve, in particular in order for the start of the filling process and the end of the filling process to be implemented in a temporally precise and reproducible manner. Through the use of a proportional valve, it is possible to implement different filling curves which ensure an optimum, product-conserving bottling process in a manner dependent on the filling product, container size, container shape and the like.

Here, proportional valves are considered to be valves which allow substantially continuously variable control of the volume flow. By contrast to shut-off valves, which can assume only the two states of open or closed, proportional valves can be controlled such that a continuous or quasi-continuous spectrum of opening positions can be reliably and reproducibly set. For this purpose, proportional valves are for example actuated by means of a stepper motor, whereby, owing to the design, even valves with a discrete spectrum of opening positions with small intervals, referred to herein as "quasi-continuous", fall under the term "proportional valves".

In the case of the use of a proportional valve, the one or more filling process variables, in one embodiment, comprise a control variable for the control of the filling valve, wherein the control variable is a measure for the degree of opening or opening state of the filling valve that is to be set. The control variable may directly or indirectly characterize the degree of opening of the proportional valve that is to be set. Here, "indirectly" means that the control variable may for example be the desired flow rate, bottling quantity or some other variable that is or determines a measure for the degree of opening of the proportional valve. It is pointed out that the term "control variable" denotes an item of information, a command, a signal or the like and does not limit the nature of the open-loop or closed-loop process control. In other words, the control variable may for example be the result of closed-loop control, for example PID closed-loop control, or open-loop control of the filling valve. Through the use of such a control variable, including variables derived therefrom, for the parameterization of the flowmeter, the working range of the flowmeter can always be set optimally with regard to the bottling quantity and desired speed, for example on the basis of a filling curve that is to be adhered to.

The flowmeter is, in certain embodiments, of inductive type, that is to say the volume flow is ascertained from the flow speed in a defined cross section by virtue of a, for example, variable electromagnetic field being applied perpendicularly with respect to the flow direction of the product, which results in a charge separation of charge carriers present in the liquid, such as ions. The voltage that arises as a result of the charge separation is proportional to the flow speed of the charge carriers and can be measured in order to determine the volume flow. In the case of such an inductive flowmeter, the parameters to be adapted during the parameterization of the flowmeter, in some embodiments, comprise a frequency and/or strength of the electromagnetic field and/or a sampling rate. It is however also possible for flowmeters of other types, for example mass flowmeters, to be dynamically parameterized by means of the controller.

The parameterization of the flowmeter, in several embodiments, comprises an adaptation of electronics of the flowmeter and/or an adaptation of an algorithm for ascertaining and/or evaluating the measurement data recorded by the flowmeter. In other words, electronics of the flowmeter, including any algorithms for processing the measurement data, are also included here in the parameterization, because an optimization of the working range of the flowmeter may also be performed at the data processing level.

The device or the filling valve is, in various embodiments, configured for free-jet filling. In this case, the filling valve discharges the filling product via a valve mouth such that said filling product is introduced into a mouth of the container, which is to be filled with the filling product, after said filling product has passed through a free-jet region. Such filling valves in the form of free-jet valves are suitable for example for the bottling of still filling products, in particular for the bottling of still water. Use may however also be made of other filling products, such as juice, smoothies, wine, milk products and the like.

The dynamic parameterization of one or more flowmeters as presented here is however not limited to free-jet fillers. It may rather be utilized expediently whenever one or more flowmeters are used for the open-loop or closed-loop control of the bottling process.

For example, the dynamic parameterization may be implemented in a so-called counterpressure process, which is used in particular for the bottling of carbonated filling products such as beer, mineral water or soft drinks. Here, the container to be filled is pre-pressurized to a positive pressure with a pressurization gas before the filling product is introduced. For this purpose, the container mouth and the valve mouth are connected to one another in pressure-tight fashion. For example, $CO_2$ is used as pressurization gas. Correspondingly, the $CO_2$ bound in the carbonated filling product is introduced into the container, which is to be filled, counter to the elevated $CO_2$ pressure during the filling process, such that a release of the $CO_2$ from the filling product can be reduced or even prevented entirely. The foaming tendency of the filling product is reduced, such that in this way the filling process can be altogether accelerated.

Alternatively, the dynamic parameterization may be implemented in negative-pressure processes, in which the filling product is introduced at a filling pressure into the container which is at a negative pressure in relation to the filling pressure. This situation will also be referred to herein as "abrupt filling", because the introduction of the filling product can be realized particularly quickly. In order to fill the container with the filling product abruptly, the interior space of the container is, with the filling valve closed and a vacuum valve open, evacuated by means of a vacuum device and correspondingly brought to a negative pressure. When the specified negative pressure, for example 0.1 bar, has been reached in the container, the vacuum valve is closed and the filling valve is opened. Abrupt filling of the container with the filling product occurs owing to the large pressure difference between the interior space of the container, in which a negative pressure now prevails, and the filling product reservoir, in which a positive pressure (relative to the negative pressure in the container and/or relative to the normal pressure) prevails. The filling process can thus be performed very quickly, and is correspondingly also ended quickly.

Since, during the filling process in the case of this abrupt filling, the negative pressure already present in the container has the effect that no displacement of gas out of the container but rather merely a depletion of the negative pressure occurs at least in the first phase of the filling, it is also possible for the filling product to flow into the container over the entire mouth cross section of the mouth of the container. No measures are required for discharging a gas that is displaced during the filling.

In one embodiment, the dynamic parameterization of one or more flowmeters may be used in the bottling of multi-component filling products.

In this case, the device is configured for filling a container with a filling product composed of a base liquid and at least one dosage component. The filling product is accordingly a multi-component filling product composed of at least two components, wherein one of the components will be referred to herein as "base liquid" for linguistic distinction and for example functions as main component. Aside from the bottling of the filling product, the device is configured for merging or mixing the components and, in this respect, performs at least a part of the production process of the filling product that is to be bottled. The base liquid is water, for example. The dosage component(s) may for example comprise syrup, liquids containing fruit flesh, pulp, flavourings etc. Since the device is however suitable not only for the bottling of beverages in the foodstuff sector but for example also for the mixing/dosing and bottling of medicines, paints and other liquids, including highly viscous and pasty liquids, the selection of the base liquid and dosage component(s) is not subject to any particular limitation.

The device according to this group of embodiments has a base reservoir, which is configured to provide the base liquid, and the filling valve, which is configured to introduce the filling product into the container. Here, the term "base reservoir" encompasses any source for providing the base liquid. The base reservoir may for example be implemented by a tank or container, or equally by a pipe or hose conduit that supplies the base liquid from an external installation. This applies analogously to any dosage reservoirs (as described further below) for providing dosage components.

In this case, the device furthermore comprises a base line with a base conduit, which fluidically connects the base reservoir to the filling valve, with a flowmeter, which is arranged on the base conduit between the base reservoir and the filling valve and is configured to determine the fluid quantity passing the flowmeter in the base conduit, and with a dosing chamber, which is arranged between the flowmeter and the filling valve. For this purpose, the flowmeter may measure the volume flow, the transported mass or some other physical variable that is a measure for the through-flowing fluid quantity. The flowmeter, in some embodiments, operates in contactless fashion. Furthermore, the flowmeter is, in various embodiments, arranged such that only the base liquid flows through it, that is to say any added dosage components (described below) do not pass to the flowmeter. The media characteristics at the flowmeter therefore do not change, and the conduit system is not contaminated by different fluids in these regions.

The device furthermore has at least one dosage branch of the base line, which at least one dosage branch is configured to introduce a dosage component into the dosing chamber of the base line. The dosing chamber thus serves for the mixing of one or more dosage components into the base liquid, and may in the simplest case be a conduit section of the base conduit. For this purpose, the dosage branch, in certain embodiments, has a dosage reservoir, which provides the dosage component, a dosage conduit, which is fluidically connected to said dosage reservoir, and a dosage valve, which switchably fluidically connects the dosage conduit to the dosing chamber.

It is pointed out here that the terms "base" and "dosage" do not make any statements regarding the nature, quality or quantity of the respective sections and filling product components. Said terms serve here primarily for linguistic distinction.

The above-discussed device for filling a container with a multi-component filling product composed of a base liquid and at least one dosage component provides numerous technical contributions and advantages over conventional concepts. For example, the complete filling of the container with multiple components at a single filling position (the position of the filling valve) makes the handling of the containers easier. Furthermore, there is no need for a container to be situated under the filling valve during the dosing phase, because the dosing is performed not during the bottling process but in the dosing chambers. The time for the dosing can be utilized synergistically for the transport of the containers. The concept presented herein can be used both for linear transfer machines with one or more filling locations and rotary machines. In the case of rotary machines, the containers can exit the carousel again already after a small angle of rotation. In the case of filling machines configured for the bottling of carbonated beverages, any depressurization time can be utilized synergistically for the dosing phase of the subsequent container.

The outlay in terms of machinery for implementing the device is relatively low, because the conduit system can be implemented using pipes or hose conduits with few valves and only a single flowmeter per line. No complex geometries need to be installed, whereby the device is easy to clean and to maintain. The risk of blockage is low. The device is furthermore suitable for dosing highly viscous fluids. Carryover of intense flavourings, which for example migrate into seals and cannot be removed from the seals by cleaning, is minimized, because the lines are first merged a short distance upstream of the filling valve, and are first introduced into the moving flow of the base line during the bottling process.

One technical problem of dosed introduction with displacement of the base liquid or main component during the introduction of the dosage component(s) and using a flowmeter relates to the limits of the dosing range. The dosing range may be influenced both by the available dosing time and by the volume flow of the medium for dosing. The dynamic parameterization of the flowmeter solves this problem, or at least improves the accuracy of the dosed introduction.

The device, in certain embodiments, furthermore comprises at least one secondary line, with a conduit which fluidically connects the base reservoir to the dosing chamber of the base line via a valve which is, in one embodiment, designed as a shut-off valve, with a flowmeter, which is arranged on the conduit between the base reservoir and the valve and is configured to determine the fluid quantity passing the flowmeter of the secondary line in the conduit, and with a dosing chamber, which is arranged between the flowmeter of the secondary line and the valve.

The conduit(s) of the one or more secondary lines likewise, similarly to the base conduit, draw the base liquid from the base reservoir, for example by virtue of said conduit(s) being connected to the base reservoir or branching off from the base conduit upstream of the flowmeter of the base line. The base line and the secondary line(s) may self-evidently draw the base liquid out of different reservoirs; in this case, the feature "base reservoir" refers to the entirety of all reservoirs that provide the base liquid.

The flowmeter of the secondary line may, like the flowmeter of the base line, measure the volume flow, the transported mass or some other physical variable that is a measure for the throughflowing fluid quantity. The flowmeter of the secondary line, in some embodiments, operates in contactless fashion. Furthermore, the flowmeter of the secondary line is, in several embodiments, arranged such that only the base liquid flows through it, that is to say any added dosage components do not pass to the flowmeter. The media characteristics at the flowmeter therefore do not change, and the conduit system is not contaminated by different fluids in these regions.

The device, in various embodiments, furthermore has at least one dosage branch of the secondary line, which at least one dosage branch is configured to introduce a dosage component into the dosing chamber of the secondary line. The dosing chamber of the secondary line thus serves, like the dosing chamber of the base line, for the mixing of one or more dosage components into the base liquid, and may in the simplest case be a conduit section of the secondary line.

For this purpose, the dosage branch of the secondary line, in some embodiments, has a dosage reservoir of the dosage branch of the secondary line, which dosage reservoir provides the dosage component, a dosage conduit of the dosage branch of the secondary line, which dosage conduit is fluidically connected to said dosage reservoir, and a dosage valve of the dosage branch of the secondary line, which dosage valve switchably fluidically connects the dosage conduit of the dosage branch of the secondary line to the dosing chamber of the secondary line.

One important technical contribution consists in the fact that, through the use of one or more secondary lines which open in the manner of dosage branches into the dosing chamber of the base line, the dosing range is increased, and the accuracy of the dosing, in particular in the case of large and small dosing quantities being mixed in simultaneously, can be considerably improved. A further increase of the dosing range and/or optimization of the dosing time furthermore follows from the fact that, in times in which dosage components of one type are not being dosed in a line, dosage components of other types can be dosed therein, that is to say for example prepared for a later bottling process. This leads to a considerable increase in the flexibility of the device.

The dosage branch of the base line and the dosage branch of the secondary line are, in several embodiments, configured to introduce the same dosage component into the associated dosing chamber. For this purpose, the dosage branch of the base line, in certain embodiments, has a dosage reservoir of the dosage branch of the base line, and the dosage branch of the secondary line has a dosage reservoir of the dosage branch of the secondary line, which dosage reservoirs both contain or provide the same dosage component. In this embodiment, the device allows particularly precise, individualized dosing in a broad dosing range because it is possible for the base line, the secondary line or a combination of both lines to be used depending on the region in which the desired dosage quantity is situated. For this purpose, the controller may be configured not only to perform closed-loop control of the dosing of the dosage component(s) into the dosing chambers but also to specify those lines or that combination of lines through which the desired dosage quantity can be dosed in the most accurate and/or efficient manner.

The different dosage regimes of the base and secondary line(s) can be implemented by means of different nominal widths or nominal sizes of the components involved. The dosing chamber of the base line thus, in some embodiments, has a different, for example larger, internal volume than the dosing chamber of the secondary line(s). Alternatively or in addition, the flowmeter of the base line is, in one embodiment, configured for determining different, for example greater, flow rates than the flowmeter of the secondary line, wherein the parameterization can be implemented here in order to dynamically set the working range of the respective flowmeter. Alternatively or in addition, the conduit cross sections of the two dosing chambers and/or flowmeters and/or conduit sections upstream of the flowmeters may differ.

It is pointed out that the terms "downstream" and "upstream" relate here to the filling direction, that is to say the direction in which the filling product flows during the emptying of the dosing chambers for the purposes of filling the container.

In various embodiments, the flowmeter of the base line and/or the flowmeter of the secondary line is configured to determine the passing or throughflowing fluid quantity in the filling direction and/or the direction opposite to the filling direction. Here, the "backflow measurement", that is to say the determination of the volume of the base liquid that is displaced backward out of the dosing chamber by the introduced dosage component, is exemplary, because in this way the mixing ratio can be determined in a simple, compact and reliable manner in terms of machine construction. In particular, only a single flowmeter is installed in each line in order to measure both the base liquid and the dosage component(s) and thus determine the ratio thereof.

The device, in one embodiment, has multiple filling valves which are arranged on a carousel of a rotary filler and which are each connected to an associated flowmeter via a product conduit, wherein the controller communicates with the filling valves and the associated flowmeters and is configured to control the filling valves during the filling process, that is to say in particular during the introduction of the filling product into the container, and the controller communicates in each case bidirectionally with the flowmeters and is configured to perform a parameterization of the corresponding flowmeter in a manner dependent on one or more filling process variables.

A method for filling a container with a filling product, for example in a beverage bottling installation, wherein the method comprises: providing the filling product and introducing said filling product into the container via a product conduit and a filling valve connected to said product conduit; ascertaining a filling product quantity passing through the product conduit by means of a flowmeter connected to the product conduit; and controlling the filling valve during the filling process, that is to say for the introduction of the filling product into the container, by means of a controller that communicates with the filling valve and with the flowmeter; wherein the controller communicates bidirectionally with the flowmeter and performs a parameterization of the flowmeter in a manner dependent on one or more filling process variables, is described herein according to various embodiments.

The features, technical effects, advantages and exemplary embodiments that have been described with reference to the device apply analogously to the method.

For example, for the reasons stated above, the controller performs the parameterization of the flowmeter, in one embodiment, during the filling process, for example during the introduction of the filling product into the container.

In one or more embodiments, for the reasons stated above, the filling valve is a proportional valve, the one or more filling process variables comprise a control variable for the control of the filling valve, and the control variable is a measure for the degree of opening of the filling valve that is to be set.

In some embodiments, the flowmeter is of inductive type and, for the reasons stated above, the parameters to be adapted during the parameterization of the flowmeter comprise a frequency and/or strength of an electromagnetic field and/or a sampling rate.

In certain embodiments, for the reasons stated above, the parameterization of the flowmeter comprises an adaptation of electronics of the flowmeter and/or an adaptation of an algorithm for ascertaining and/or evaluating the measurement data recorded by the flowmeter.

In various embodiments, the filling product has a base liquid and at least one dosage component, wherein, for the reasons stated above, the method in this case furthermore comprises: providing the base liquid by means of the base reservoir; introducing the base liquid from the base reservoir into the dosing chamber of the base line; introducing the dosage component from the dosage branch of the base line into the dosing chamber of the base line, wherein, for the dosed introduction of the dosage component, the flowmeter of the base line determines the filling product quantity passing the flowmeter in the base conduit; and emptying the dosing chamber of the base line into the container via the filling valve.

In the case of one or more secondary lines, this method may correspondingly furthermore comprise: introducing the base liquid from the base reservoir into the dosing chamber of the secondary line; introducing the dosage component from the dosage branch of the secondary line into the dosing chamber of the secondary line, wherein, for the dosed introduction of the dosage component, the flowmeter of the secondary line determines the fluid quantity passing the flowmeter of the secondary line in the conduit of the secondary line; and emptying the dosing chamber of the base line and the dosing chamber of the secondary line into the container via the filling valve. The emptying of the dosing chamber of the base line and of the dosing chamber of the secondary line is for example performed substantially simultaneously. This can be achieved through simultaneous opening of the filling valve and of the valve of the secondary line.

Various filling methods and further advantages and features of the present invention will become apparent from the following description of exemplary embodiments. The features described therein may be implemented individually or in combination with one or more of the features presented above, where the features do not contradict one another. The following description of exemplary embodiments is given here with reference to the appended drawings.

BRIEF DESCRIPTION OF THE FIGURES

Further embodiments of the invention will be discussed in more detail by the following description of the figures.

DETAILED DESCRIPTION

Exemplary embodiments will be described below on the basis of the figures. Here, identical or similar or identically acting elements are in some cases denoted by identical reference designations in the figures, and a repeated description of these elements will be omitted if appropriate in order to avoid redundancy.

Figure 1:
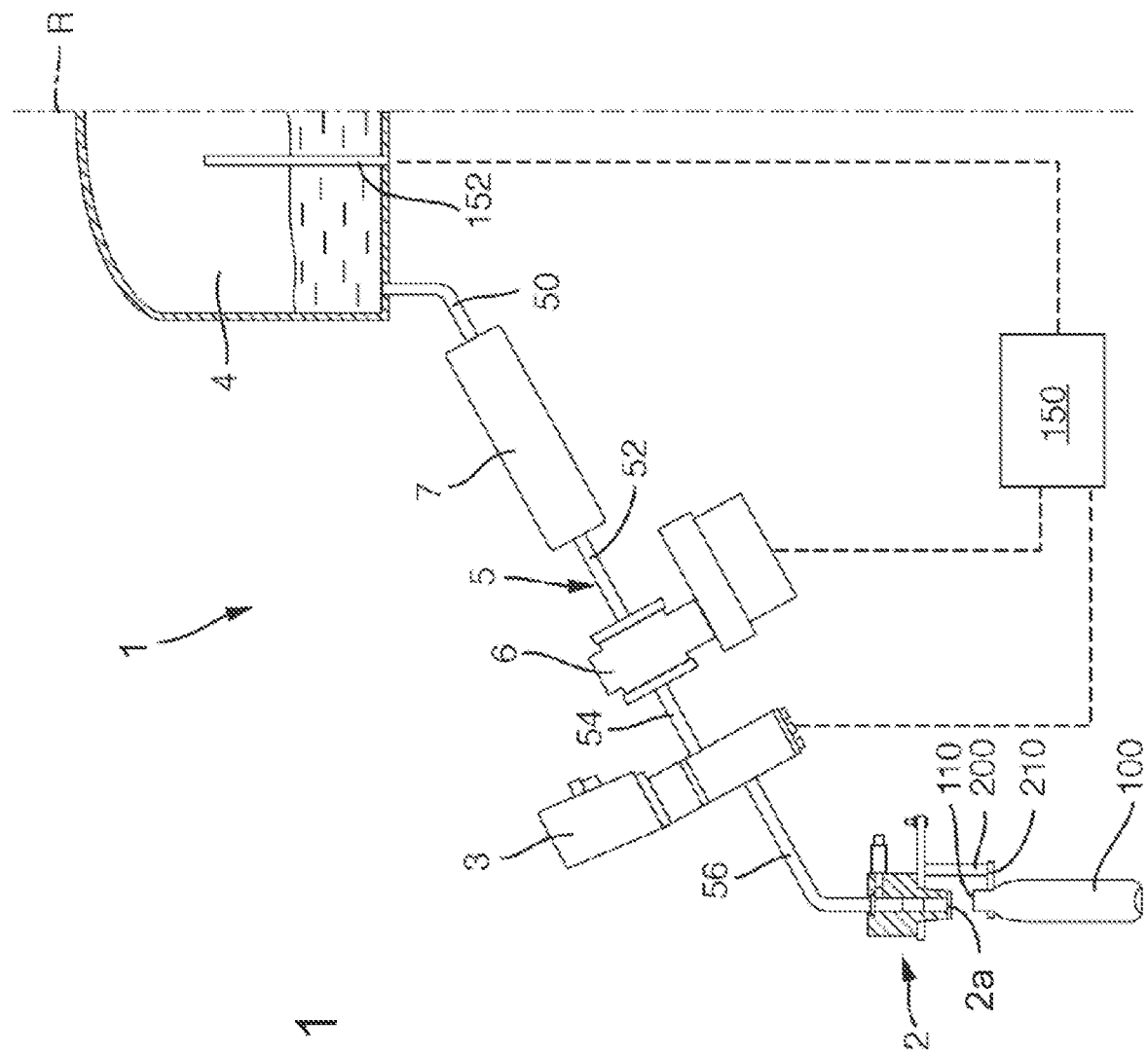
FIG. 1 is a schematic illustration of a device for filling a container with a filling product.

FIG. 1 schematically shows a device 1 for filling a container 100 with a filling product.

In the exemplary embodiment shown in FIG. 1, the device 1 comprises a filling valve 2, which in this case is provided by way of example in the form of a free-jet valve. The filling valve 2 discharges a filling product via a valve mouth 2a such that said filling product is introduced into a mouth 110 of the container 100, which is to be filled with the filling product, after said filling product has passed through a free-jet region. Such filling valves 2 in the form of free-jet valves are known for example for the bottling of still filling products, in particular for the bottling of still water. Use may however also be made of other filling products, such as juice, smoothies, wine, milk products and the like. Carbonated beverages, such as sparkling water, beer, soft drinks and the like, are normally bottled in installations in a counterpressure process or negative-pressure process, which will be discussed further below on the basis of further embodiments.

The container 100 to be filled is held at or under the filling valve 2 during the filling process by means of a container holder 200, which has for example a holding clamp 210 for holding the container 100 to be filled in the neck region, for example below a neck ring (not shown here) of the container 100. This is also referred to as so-called "neck handling" of the container 100 to be filled. "Neck handling" is used in particular in the case of the filling of plastics containers in the form of polyethylene terephthalate (PET) bottles.

In an alternative which is not shown in the figures, the container 100 to be filled may also be held or supported in its base region, for example by a guide plate on which the container 100 to be filled stands. This is also referred to as so-called "base handling" of the container 100 to be filled. "Base handling" is used in particular in the case of the filling of glass bottles.

In an alternative which is likewise not shown in the figures, the container 100 to be filled may also be held and/or supported and transported in the region of the container or bottle waist or in some other suitable manner.

The filling valve 2 is, in some embodiments, in the form of, or comprises, a proportional valve 3, which is positioned before the valve mouth 2a, that is to say is arranged upstream of the valve mouth 2a. Optionally, in the region of the valve mouth 2a, there may be provided a shut-off valve that can open/close the valve mouth 2a as required. The proportional valve 3 is configured to vary the volume flow of the filling product, that is to say to regulate the filling product quantity that is introduced into the container 100 per unit of time. It is the aim to ensure an efficient, exact and product-conserving filling process.

The proportional valve 3 may for example be constructed such that an annular gap through which the respective filling product flows is variable in terms of its dimensions. The switching position of the proportional valve 3, that is to say for example the presently selected measurement/dimension of the annular gap, is known and reproducibly settable, for example through the use of a stepper motor for driving the proportional valve 3.

One or more characteristics of the filling curve, that is to say of the volume flow per unit of time, such as the end of the filling process when a desired filling level is reached, or the filling curve in its entirety, can be specified by means of the proportional valve 3.

Before the actual process of bottling in the container 100 to be filled, the filling product is temporarily stored in a filling product reservoir 4, wherein the filling product reservoir 4 is shown in this case in the form of a central vessel of a rotary filler. In an alternative embodiment, the filling product reservoir 4 may for example also be in the form of an annular vessel, a purge line or a distributor feed line.

In the filling product reservoir 4, the filling product is introduced up to a certain filling level and, from there, can flow via a filling product conduit 5, which in this case has for example a first conduit section 50, a second conduit section 52, a third conduit section 54 and a fourth conduit section 56, to the filling valve 2 and be introduced from there into the container 100 to be filled.

Aside from the proportional valve 3 for the open-loop or closed-loop control of the filling product flow, a flowmeter 6 is also provided, which is configured for detecting the fluid quantity or the volume flow of the filling product flowing through the filling product conduit 5. It is optionally also possible for the filling product quantity introduced into the container 100 to be ascertained by means of the flowmeter 6, for example by integration or adding-up of the ascertained volume flow. In this way, after a desired filling product level has been reached in the container 100 to be filled, the filling process can be ended by closing the proportional valve 3 and/or by closing a shut-off valve (not shown here).

The filling valve 2 including proportional valve 3, the flowmeter 6 and sections of the filling product conduit 5, for example the conduit sections 52, 54 and 56 may form a notional and/or structural unit or component, hereinafter referred to as "filling element".

The device 1 shown in FIG. 1 shows only one filling element, which is connected to the filling product reservoir 4. The device 1 however, in some embodiments, has a multiplicity of filling elements, which are for example arranged around the then common filling product reservoir 4 in order to thus form a rotary filler. The rotary filler in this case rotates about a schematically shown axis of rotation R in order to fill the containers 100 to be filled, and simultaneously transport said containers, during the rotation. For example, more than 20 or 50 filling valves 10 may be arranged on the circumference of the rotary filler, such that a flow of containers 100 to be filled that is fed to the rotary filler can be filled in an efficient manner.

The device 1 may—as a constituent part of or outside the filling element—have one or more filters 7, said filter(s), in one embodiment, being arranged between the first section 50 of the filling product conduit 5 and the second section 52 of the filling product conduit 5. The filter 7 is configured for purifying the filling product prior to the bottling process, for example in order to filter out particles, viruses, bacteria, germs, fungi etc. from the filling product. The filter 7 is of particular importance if the device 1 is provided for the bottling of still water.

The present filling level of the filling product in the filling product reservoir 4 may be measured for example by means of a filling level probe 152.

The device 1 furthermore has a controller 150 which is configured for communicating with the filling element. In particular, the controller 150 communicates with the proportional valve 3 and with the flowmeter 6 in order to specify the present switching position of the proportional valve 3 using the volume flow values ascertained by the flowmeter 6. An evaluation of the filling level in the filling product reservoir 4 may also be performed by means of the controller 150.

The controller 150 may be central or decentralized, may be a constituent part of Internet-based and/or cloud-based applications, or may be implemented in some other way, and may if necessary, access databases. The controller 150 may communicate with the corresponding components in wireless or wired fashion.

The controller 150 is furthermore configured to adapt one or more parameters of the flowmeter 6 to one or more filling process variables. In other words, a parameterization of the flowmeter 6, in particular for the purposes of adapting the measurement range or for the purposes of optimizing the measurement range, is performed in a manner dependent on one or more filling process variables. For this purpose, the controller 150 and the flowmeter 6 communicate bidirectionally. The adaptation of the one or more parameters of the flowmeter 6 is, in some embodiments, performed during the filling process, that is to say during the introduction of the filling product into the container 100.

In the case of an inductive flowmeter 6, the parameters to be adapted comprise, for example, one or more of the following parameters: frequency of the electromagnetic field for the charge separation in the filling product, strength of the electromagnetic field, sampling rate. In the case of a flowmeter 6 that uses the differential-pressure or mass flow measurement method, the parameters to be adapted comprise, for example, one or more of the following parameters: measurement aperture, frequency of an oscillatory system, amplitude of the oscillatory system. Alternatively or in addition, an algorithm for evaluating the sensor data of the flowmeter 6 and compiling the data, in particular volume flow data, processed by the controller 150 may also be adapted in a manner dependent on one or more filling process variables. Electronics of the flowmeter, including any algorithms for processing the measurement data, are also included in the parameters for the parameterization of the flowmeter 6.

A filling process variable for the parameterization of the flowmeter 6 may in particular be a control variable of the controller 150 at the proportional valve 3. The control variable may directly or indirectly characterize the degree of opening of the proportional valve 3 that is to be set. Here, "indirectly" means that the control variable may for example be the desired flow rate, bottling quantity or some other variable that is or determines a measure for the degree of opening of the proportional valve 3.

By means of such bidirectional communication between the flowmeter 6 and the controller 150, the flowmeter 6 can at all times be dynamically optimally parameterized with regard to the bottling quantity and desired speed, for example on the basis of a filling curve that is to be adhered to, whereby the bottling accuracy and reliability are improved.

The parameterization of the flowmeter 6 as presented above may optionally also be performed by the controller 150 indirectly, by virtue of communication between the proportional valve 3 and the flowmeter 6 being implemented such that the proportional valve 3 transmits its state to the flowmeter 6, which can thereupon adapt its parameters or its measurement range to the degree of opening of the proportional valve 3.

Alternatively or in addition to the control variable, one or more other filling process variables may be used for the parameterization of the flowmeter 6. In this regard, use may for example be made of one or more of the following filling process variables: viscosity of the filling product, Brix content of the filling product, fruit fibre content or lumpiness of the filling product, pulp content and/or other filling product characteristics.

Figure 2:
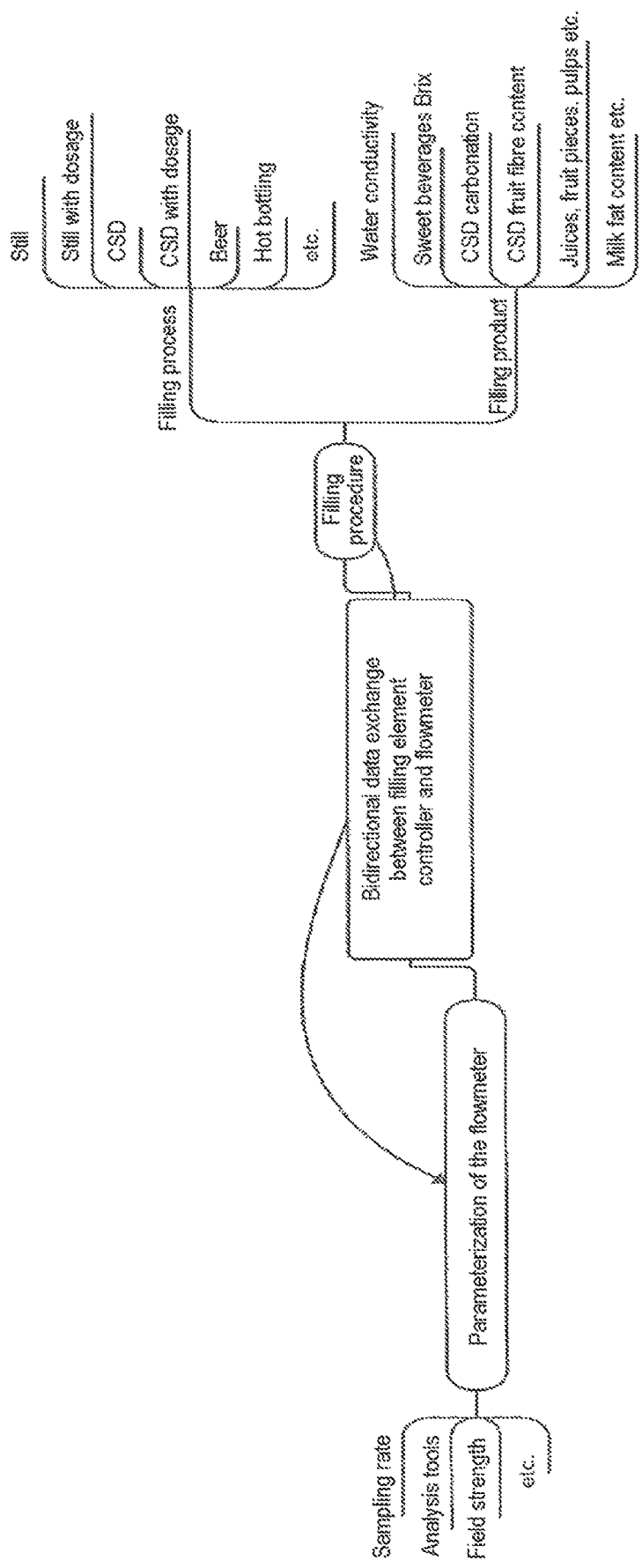
FIG. 2 is a diagram that schematically illustrates the parameterization of a flowmeter on the basis of exemplary parameters and filling process variables.

An overview of the parameterization of the flowmeter 6, exemplary parameters and filling process variables is shown in FIG. 2.

By means of the adaptation of the working range of the flowmeter 6 to filling process variables such as filling product characteristics and/or control variables at the proportional valve 3, for example the intended or expected flow speed, significantly better accuracy can be achieved in the bottling process. The accuracy of dosage operations can likewise be improved, as presented below with regard to the exemplary embodiments of FIGS. 3 and 4. Through the improvement of the bottling accuracy and reliability, rejects can be reduced, and resources, in particular also filling product itself, can be saved.

The dynamic parameterization of one or more flowmeters 6 as presented here is not limited to free-jet fillers. The dynamic parameterization may rather be utilized expediently whenever one or more flowmeters 6 are used for the open-loop or closed-loop control of the bottling process.

For example, the dynamic parameterization may be implemented in a so-called counterpressure process, which is used in particular for the bottling of carbonated filling products such as beer, mineral water or soft drinks. Here, the container 100 to be filled is pre-pressurized to a positive pressure with a pressurization gas before the filling product is introduced. For this purpose, container mouth 110 and the valve mouth 2a are connected to one another in pressure-tight fashion. For example, $CO_2$ is used as pressurization gas. Correspondingly, the $CO_2$ bound in the carbonated filling product is introduced into the container, which is to be filled, counter to the elevated $CO_2$ pressure during the filling process, such that a release of the $CO_2$ from the filling product can be reduced or even prevented entirely. The foaming tendency of the filling product is reduced, such that in this way the filling process can be altogether accelerated.

Alternatively, the dynamic parameterization may be implemented in negative-pressure processes, in which the filling product is introduced at a filling pressure into the container which is at a negative pressure in relation to the filling pressure. This situation will also be referred to herein as "abrupt filling", because the introduction of the filling product can be realized particularly quickly. In order to fill the container 100 with the filling product abruptly, the interior space of the container 100 is, with the filling valve 2 closed and a vacuum valve (not illustrated in the figures) open, evacuated by means of a vacuum device (not illustrated in the figures) and correspondingly brought to a negative pressure. When the specified negative pressure, for example 0.1 bar, has been reached in the container 100, the vacuum valve is closed and the filling valve 2 is opened. Abrupt filling of the container 100 with the filling product occurs owing to the large pressure difference between the interior space of the container 100, in which a negative pressure now prevails, and the filling product reservoir 4, in which a positive pressure (relative to the negative pressure in the container 100 and/or relative to the normal pressure) prevails. The filling process can thus be performed very quickly, and is correspondingly also ended quickly.

Since, during the filling process in the case of the abrupt filling, the negative pressure already present in the container 100 has the effect that no displacement of gas out of the container 100 but rather merely a depletion of the negative pressure occurs at least in the first phase of the filling, it is also possible for the filling product to flow into the container 100 over the entire mouth cross section of the mouth 110 of the container 100. No measures are required for discharging a gas that is displaced during the filling.

Figure 3:
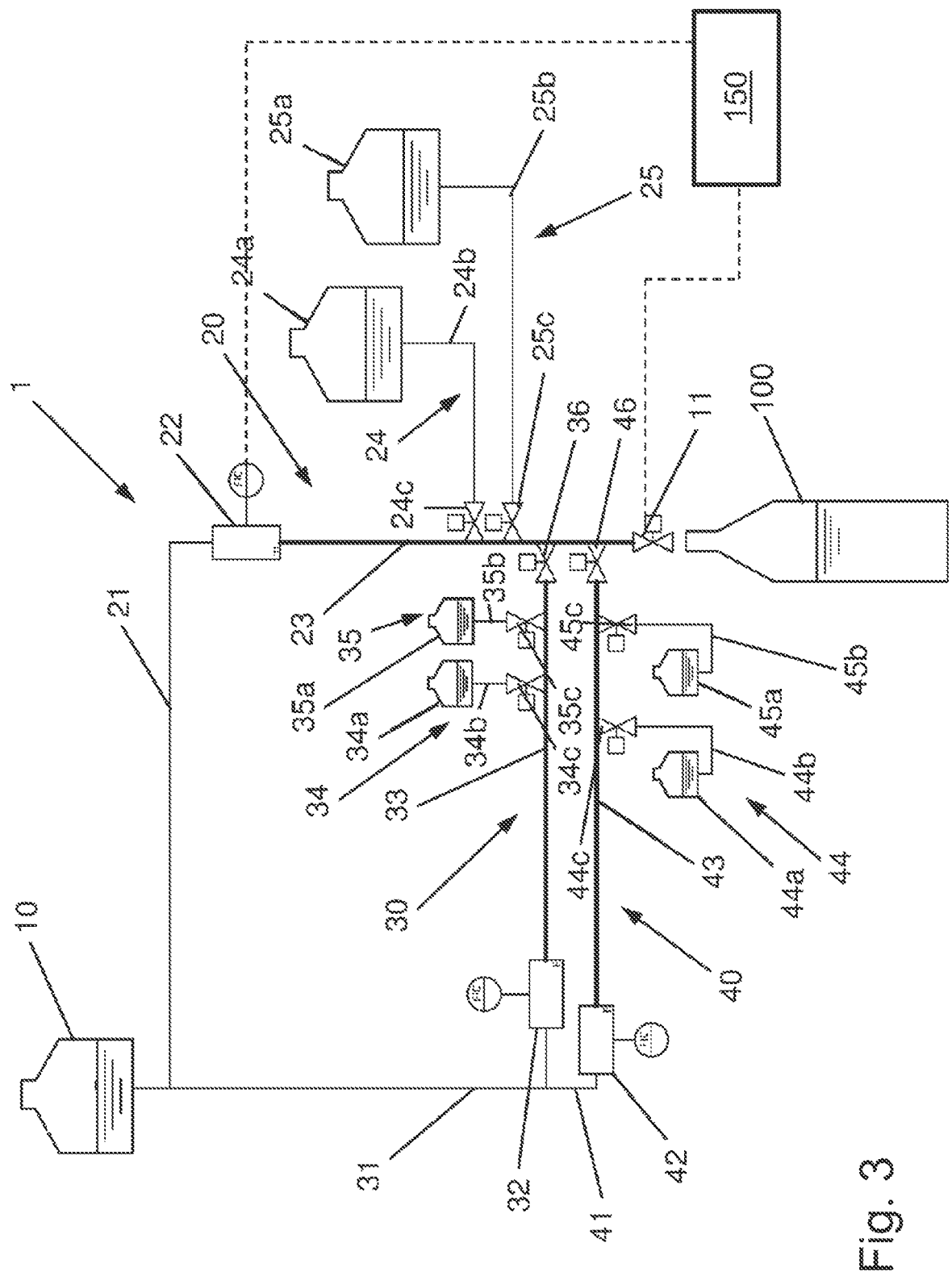
FIG. 3 is a schematic illustration of a device for filling a container with a filling product according to a further exemplary embodiment.

A further exemplary embodiment for the dynamic parameterization of one or more flowmeters emerges from FIG. 3. FIG. 3 is a schematic illustration of a device 1 for filling a container 100 with a multi-component filling product. Since some components, such as the filling valve, the flowmeter etc. of the device 1 in the case of the exemplary embodiment of FIG. 3 have a different construction and a different function in relation to the exemplary embodiment of FIG. 1, distinct reference designations are used in some cases for the purposes of differentiation.

The device 1 of FIG. 3 has a base reservoir 10 for a base liquid, which can also be regarded as main product, and a filling valve 11. The base liquid and dosage components, which are admixed by means of a fluid system described below, are introduced via the filling valve 11 into the container 100. The base liquid is water, for example. The dosage components may for example comprise syrup, liquids containing fruit flesh, pulp, flavourings etc. Since the device 1 is however suitable not only for the bottling of beverages in the foodstuff sector but for example also for the mixing/dosing and/or bottling of medicines, cosmetics, paints and other liquids, including highly viscous and pasty liquids, the selection of the base liquid and dosage component(s) is not subject to any particular limitation.

The device 1 has a base line 20 and, in the present exemplary embodiment, for example two secondary lines 30, 40, which are configured for mixing dosage components in different quantities and/or in greater numbers into the base liquid. The secondary lines 30, 40 are however optional and, if present, the number thereof may be scaled as desired. The dosing by way of reverse displacement, as presented in this group of exemplary embodiments, may likewise be implemented in the case of the base line 20 without secondary lines 30, 40 connected thereto.

For this purpose, the base line 20 has a base conduit 21, which extends from the base reservoir 10 to the filling valve 11. The base conduit 21 is equipped with a flowmeter 22 of the base line. The flowmeter 22 is, in one embodiment, a contactless, in particular an inductive, measuring device for determining the liquid flow, volume flow, the transported mass or the like passing the flowmeter 22. This applies equally to the flowmeters 32, 42 of the secondary lines, as described below.

That section of the base conduit 21 which is situated between the flowmeter 22 and the filling valve 11 is referred to as dosing chamber 23 of the base line 20, or comprises such a dosing chamber. In the present exemplary embodiment, two dosage branches 24, 25 open into the dosing chamber 23. The two dosage branches 24, 25 each have a dosage reservoir 24a, 25a, a dosage conduit 24b, 25b, which is fluidically connected to said dosage reservoir, and a dosage valve 24c, 25c, which switchably fluidically connects the associated dosage conduit 24b, 25b to the dosing chamber 23 of the base line.

With the selection of the nominal width of the dosing chamber 23, of the flowmeter 22 and/or of the dosage branches 24, 25, a dosing region for the base line 20 is specified, which in the present exemplary embodiment is, in various embodiments, configured for relatively large dosage quantities.

For the dosage of other, for example relatively small, quantities, the device 1 according to the present exemplary embodiment has a first and a second secondary line 30, 40, which may for example be correspondingly configured for the dosage of small quantities and extremely small quantities. The first secondary line 30 has a conduit 31 of the first secondary line, which conduit is equipped with a flowmeter 32 of the first secondary line. Analogously, the second secondary line 40 has a conduit 41 of the second secondary line, which conduit is equipped with a flowmeter 42 of the second secondary line.

The conduits 31 and 41 of the two secondary lines 30, 40, similarly to the base conduit 21, draw in the base liquid by virtue of said conduits being connected to the base reservoir 10 or branching off from the base conduit 21 upstream of the flowmeter 22. The two conduits 31, 41 open into the dosing chamber 23 of the base line 20 via a corresponding valve 36, 46 of the first and second secondary lines, which valves are, in one embodiment, designed as shut-off valves. Analogously to the base line 20, in each case one dosing chamber, referred to herein as dosing chamber 33 of the first secondary line and dosing chamber 43 of the second secondary line, is situated between the flowmeters 32, 42 and the associated valves 36, 46. It is pointed out that the base line 20 and the secondary lines 30, 40 may draw the base liquid out of different reservoirs, even though only one base reservoir 10 is shown in FIG. 3 for the sake of clarity.

Two dosage branches open into each of the dosing chambers 33, 43 of the secondary lines, which dosage branches are, maintaining the terminology chosen herein, referred to as first dosage branch 34 of the first secondary line, second dosage branch 35 of the first secondary line, first dosage branch 44 of the second secondary line and second dosage branch 45 of the second secondary line. The dosage branches 34, 35, 44, 45 of the secondary lines each have a dosage reservoir 34a, 35a, 44a, 45a, a dosage conduit 34b, 35b, 44b, 45b, which is fluidically connected to said dosage reservoir, and a dosage valve 34c, 35c, 44c, 45c, which switchably fluidically connects the dosage conduit 34b, 35b, 44b, 45b to the associated dosing chamber 33, 43.

The first dosage reservoirs 24a, 34a, 44a, in certain embodiments, provide a first dosage component and the second dosage reservoirs 25a, 35a, 45a, in several embodiments, provide a second dosage component that differs from the first dosage component, such that, in principle, the same dosage components can be added to the base liquid in the secondary lines 30, 40 as in the base line 20, but in a manner optimized for different dosage quantities or dosage regimes. Such correspondence is however not imperatively necessary. Accordingly, the dosage reservoirs 24a, 34a, 44a, 25a, 35a, 45a of the base and secondary lines 20, 30, 40 may also contain different dosage components, whereby the flexibility of the installation can be increased, for example by virtue of dosage components which are not presently required being pre-dosed for later use.

The filling product conduit 5 of the embodiment of FIG. 1, the base conduit 21, the dosing chambers 23, 33, 43 and the dosage conduits 24b, 25b, 34b, 44b, 35b and 45b are jointly encompassed by the term "product conduit".

The dosage and bottling process will be described below on the basis of the device 1 according to the exemplary embodiment of FIG. 3:

All lines, that is to say the base line 20 and the two secondary lines 30, 40, are purged with the base liquid at the start of each filling cycle, whereby, with the filling valve 11 closed and valves 36, 46 closed, the associated dosing chambers 23, 33, 43 are filled with the base liquid. During the filling of the dosing chambers 23, 33, 43, the associated flowmeters 22, 32, 42 can measure the throughflow of base liquid in the forward direction, that is to say the filling direction. In this way, the desired total filling volume of the corresponding dosing chamber 23, 33, 43 can be ascertained and set.

The dosage components are subsequently introduced into the dosing chambers 23, 33, 43 by virtue of the corresponding dosage valves 24c, 25c, 34c, 35c, 44c, 45c being opened. The dosage components may be introduced simultaneously or successively. The introduction of the dosage components has the effect that a proportion of the base liquid is displaced backward out of the dosing chambers 23, 33, 43. Here, the backwardly directed throughflow is detected by the corresponding flowmeters 22, 32, 42. The dosage valves 24c, 25c, 34c, 35c, 44c, 45c, which may be designed as pure shut-off valves or as closed-loop-controllable shut-off valves, remain open until such time as the desired volume of the dosage component(s) has been introduced into the dosing chambers 23, 33, 43. For this purpose, the flowmeters 22, 32, 42 and the valves of the device 1 are communicatively connected to a control device (not illustrated in the figures) which, on the basis of the detection results of the flowmeters 22, 32, 42, determines the time of the opening/closing, or generally the switching behaviour, of the components involved. It is pointed out that the quantity of each individual dosage component can be determined exactly by virtue of different dosage components being introduced to a line successively.

In the subsequent bottling phase, all dosing chambers 23, 33, 43 are emptied simultaneously or successively via the filling valve 11 into the container 100, whereby the lines are fully purged. The bottling volume is thus determined from the sum of the bottling volumes of all dosing chambers 23, 33, 43.

The reservoirs 10, 24a, 25a, 34a, 35a, 44a, 45a for the base liquid and the dosage components may be in each case separately or jointly pressurized with a gas pressure in the headspace in order to ensure the necessary pressure difference for the conveyance of the corresponding fluids. By means of individual adaptability of the conveying pressure, the flow speed can be varied and set even in the case of different media with varying densities and/or viscosity.

Through the configuration of the nominal widths of the dosing chambers 23, 33, 43 for the desired dosing quantities and flow speeds, it is possible to achieve exact dosing and optimum purging with the base liquid. The device 1 furthermore allows precise, individualized dosing in an extremely broad dosing range, because the small and extremely small quantities, which are difficult to dose, are relocated into secondary lines 30, 40 that are optimized for the purpose. The control device can now, depending on the desired dosage quantity, determine that line, or that combination of lines, by which the desired filling product can best be produced.

The merging of the lines a short distance upstream of the filling valve 11 leads, during the bottling phase, to a bottling process without carryover, owing to the dosage being performed into a moving flow.

It is pointed out that neither the number of lines nor the number of dosage branches that open into the individual lines are subject to any particular limitation.

The duration of the dosing phase specifies the maximum dosing time available for a dosage component if the other dosage components do not need to be dosed to the corresponding line. Likewise, there is no need for a container 100 to be situated under the filling valve 11 during the dosing phase. The dosing phase can thus be used synergistically for the transport of the container.

A further exemplary embodiment takes into consideration the fact that the reaction times between the flow rate detection by means of the flowmeters 22, 32, 42 and the switching of the dosage valves 24c, 25c, 34c, 35c, 44c, 45c, in particular the fluctuations in the reaction times, jointly determine the accuracy of the dosing quantity. In the foodstuff sector, for applications involving contact with the product, use is predominantly made of pneumatic valves. These however have the technical disadvantage that they tend to have longer reaction times in relation to magnetically driven valves, and can thus lead to a reduction in dosage accuracy.

Figure 4:
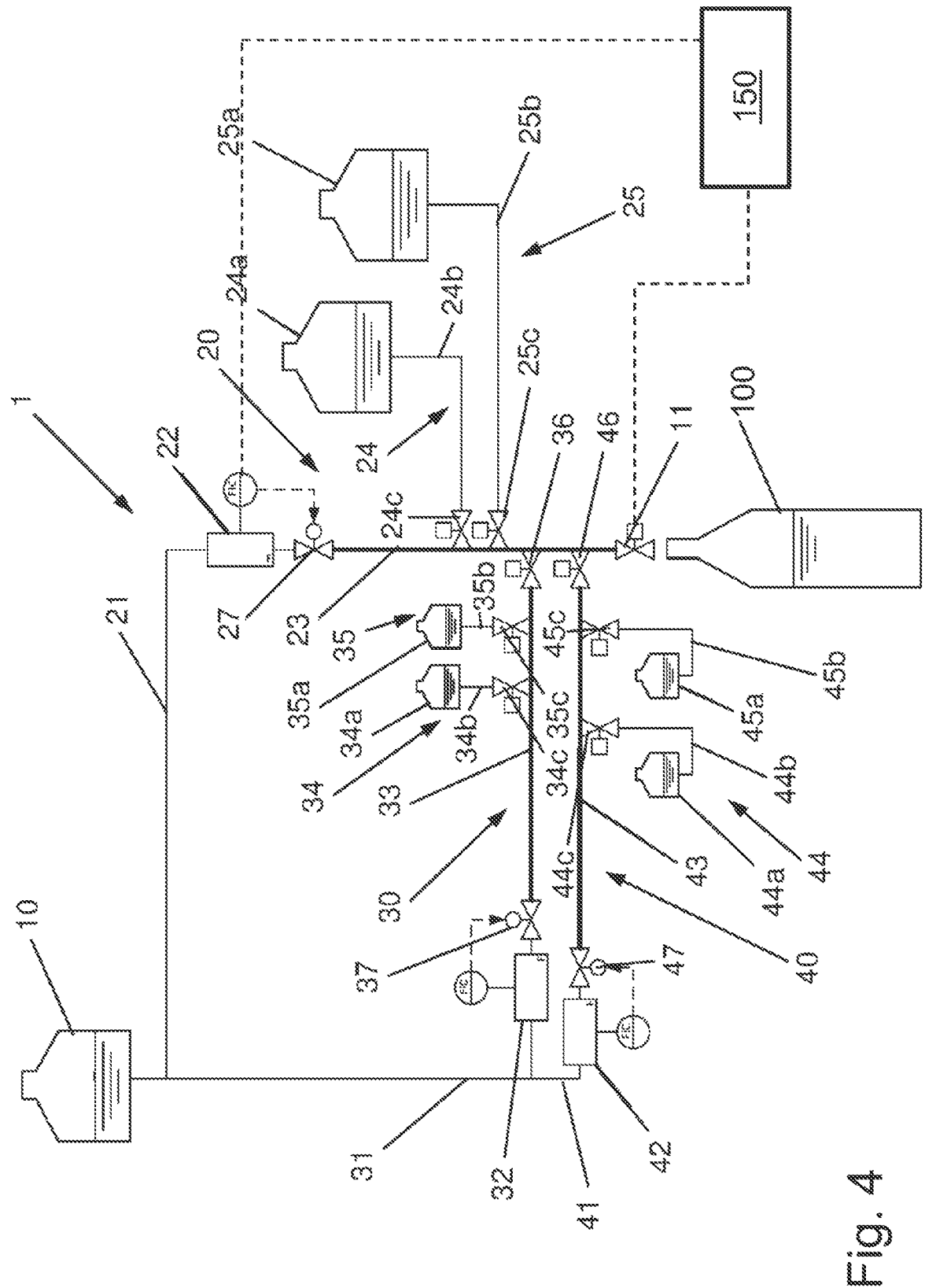
FIG. 4 is a schematic illustration of a device for filling a container with a multi-component filling product according to a further exemplary embodiment.

For this reason, it is expedient, in particular in the case of the bottling of filling products in the foodstuff sector, to arrange dosing valves in the vicinity of the flowmeters 22, 32, 42, for example directly downstream of the flowmeters. FIG. 4 is a schematic illustration of such a device 1 according to a further exemplary embodiment.

Here, a dosing valve 27, 37, 47 is situated directly downstream of each of the flowmeters 22, 32, 42. The dosing valves 27, 37, 47 are, in some embodiments, magnetically switchable in order to optimize their reaction time. The dosing valves 27, 37, 47 react very quickly in the case of a magnetic drive and may be designed either as pure shut-off valves, in particular for short dosing times, and as shut-off and control valves, in particular for relatively long dosing times. If the dosing valves 27, 37, 47 are furthermore installed and configured such that only the base liquid, for example water, flows through them, the demands on hygiene and purging behaviour are less stringent than in the case of the filling valve 11 and the valves 36, 46 of the secondary lines 30, 40, through which the dosage components can also flow.

It is pointed out that it is not imperatively necessary for every line to be equipped with a dosing valve 27, 37, 47. Since it is sought to achieve an improvement in dosing accuracy in particular for small and extremely small quantities, it may for example suffice for one or more of the secondary lines 30, 40 to have a dosing valve 37, 47.

The rest of the construction of the device 1 as per FIG. 4 does not differ from the device 1 illustrated in FIG. 3.

The device 1 and the method for producing a multi-component filling product from a base liquid and at least one dosage component mixed therein, and bottling the filling product, in accordance with the exemplary embodiments of FIGS. 3 and 4 as presented herein, provide different technical contributions and advantages over conventional concepts. For example, the complete filling of the container 100 at a single position simplifies the handling of the containers 100. Furthermore, there is no need for a container 100 to be situated under the filling valve 11 during the dosing phase, because the dosing is performed not during the bottling process but in the dosing chambers 23, 33, 43. The time for the dosing can be used synergistically for the transport of the containers. The concept presented herein can be used both for linear transfer machines with one or more filling locations and rotary machines. In the case of rotary machines, the containers 100 can exit the carousel again already after a small angle of rotation. In the case of filling machines configured for the bottling of carbonated beverages, any depressurization time can be utilized synergistically for the dosing phase of the subsequent container 100.

One important technical contribution consists in the fact that, through the use of one or more secondary lines 30, 40 which open in the manner of dosage branches into the dosing chamber 23 of the base line 20, the dosing range is enlarged, and the accuracy of the dosing, in particular in the case of large and small dosing quantities being mixed in simultaneously, can be improved. A further enlargement of the dosing range and/or optimization of the dosing time also follows from the fact that, in times in which particular dosage components are not being dosed in a line, other components can be dosed. This leads to a considerable increase in the flexibility of the dosing system.

It is always the case that only the base liquid, that is to say in most cases water, flows through the flowmeters 22, 32, 42 and any associated dosing valves 27, 37, 47. The media characteristics therefore do not change, and the conduit system is not contaminated by different fluids in these regions.

The outlay in terms of machinery for implementing the device 1 is low, because the conduit system can be implemented using pipes or hose conduits with few valves and only a single flowmeter per line. No complex geometries need to be installed, whereby the device 1 is easy to clean and to maintain. The risk of blockage is low. The device 1 is furthermore suitable for dosing highly viscous fluids. Carryover of intense flavourings, which for example migrate into seals and cannot be removed from the seals by cleaning, is minimized, because the lines are first merged a short distance upstream of the filling valve 11, and the filling products from the secondary lines 30, 40 are furthermore first introduced into the moving flow of the base line 20 during the bottling process.

The device 1 as per FIGS. 3 and 4 furthermore has, as in the embodiment of FIG. 1, a controller 150 which is configured for communicating with the filling element. In particular, the controller 150 communicates with the filling valve 11 and the flowmeter 22. The controller 150 is configured to adapt one or more parameters of the flowmeter 22 to one or more filling process variables. In other words, a parameterization of the flowmeter 22, in particular for the purposes of adapting the measurement range or for the purposes of optimizing the measurement range, is performed in a manner dependent on one or more filling process variables. For this purpose, the flowmeter 22 and the controller 150 communicate bidirectionally. The adaptation of the one or more parameters of the flowmeter 22 is, in some embodiments, performed during the filling process, that is to say during the dosed introduction and/or the introduction of the filling product into the container 100.

Even though it appears in FIGS. 3 and 4 that the flowmeters 32 and 42 of the secondary lines 30 and 40 and the valves 24c, 25c, 36, 46, 34c, 35c, 44c, 45c, 27, 37 and 47 do not communicate with the controller 150 (for the sake of clarity, the dashed lines have been omitted), these communicate at least unidirectionally with the controller 150. It is however possible in certain embodiments for the flowmeters 32 and 42 to communicate bidirectionally with the controller 150 in order to be able to perform a parameterization of the flowmeters 32 and 42, in particular for the purposes of adapting the measurement range or for the purposes of optimizing the measurement range, in a manner dependent on one or more filling process variables.

The above descriptions relating to the embodiment of FIG. 1 apply with regard to the construction and exemplary parameters of the flowmeters 22, 32, 42, exemplary filling process variables for the parameterization of the one or more flowmeters 22, 32, 42 and technical effects and advantages of the dynamic parameterization.

Where applicable, all individual features that have been presented in the exemplary embodiments may be combined and/or interchanged with one another without departing from the scope of the invention.

What is claimed is:

1. A device for filling a container with a filling product, comprising:
   a plurality of filling valves that are arranged on a carousel of a rotary filler, wherein each filling valve from the plurality of filling valves is configured to introduce the filling product into the container;
   a plurality of flowmeters, wherein each flowmeter from the plurality of flowmeters is connected to an associated filling valve from the plurality of filling valves via a product conduit and is configured to ascertain a filling product quantity passing each flowmeter from the plurality of flowmeters in the product conduit; and
   a controller that communicates with the plurality of filling valves and with the plurality of flowmeters and is configured to control the plurality of filling valves during a filling process, wherein the controller communicates bidirectionally with each flowmeter from the plurality of flowmeters and is further configured to perform a parameterization of each flowmeter from the plurality of flowmeters in a manner dependent on one or more filling process variables.

2. The device of claim 1, wherein the controller is further configured to perform the parameterization of each flowmeter from the plurality of flowmeters during the filling process.

3. The device of claim 1, wherein the controller is further configured to perform the parameterization of each flowmeter from the plurality of flowmeters during an introduction of the filling product into the container.

4. The device of claim 1, wherein the one or more filling process variables comprise a control variable of the controller usable to control at least one filling valve from the plurality of filling valves and/or one or more filling product characteristics.

5. The device of claim 4, wherein the one or more filling product characteristics comprise a viscosity of the filling product, a Brix content of the filling product, a fruit fiber content of the filling product, and/or a pulp content of the filling product.

6. The device of claim 1, wherein at least one filling valve from the plurality of filling valves comprises a proportional valve.

7. The device of claim 6, wherein the one or more filling process variables comprise a control variable of the controller for control of the proportional valve, and the control variable is a measure for a degree of opening of the proportional valve that is to be set.

8. The device of claim 1, wherein at least one flowmeter from the plurality of flowmeters comprises an inductive type flowmeter, and at least one parameter to be adapted during the parameterization of the at least one flowmeter comprises a frequency and/or a strength of an electromagnetic field, and/or a sampling rate.

9. The device of claim 1, wherein the parameterization of at least one flowmeter from the plurality of flowmeters comprises an adaptation of electronics of the at least one flowmeter, and/or an adaptation of an algorithm for ascertaining and/or evaluating measurement data detected by the at least one flowmeter.

10. The device of claim 1, wherein:
    the filling product comprises a base liquid and at least one dosage component, and
    the device further comprises:
       a base reservoir configured to provide the base liquid,
       a base line with a base conduit that fluidically connects the base reservoir to at least one filling valve from the plurality of filling valves and with a dosing chamber that is arranged between at least one flowmeter from the plurality of flowmeters and the at least one filling valve, wherein the at least one flowmeter is arranged on the base conduit between the base reservoir and the at least one filling valve, and is configured to determine the filling product quantity passing the at least one flowmeter in the base conduit, and
       at least one dosage branch of the base line that is configured to introduce a dosage component into the dosing chamber of the base line.

11. The device of claim 10, wherein the at least one flowmeter is configured to determine the filling product quantity passing in a filling direction and/or in a direction opposite to the filling direction.

12. A method for filling a plurality of containers with a filling product, comprising:
    introducing the filling product into the containers via a plurality of product conduits and a plurality of filling valves connected to an associated product conduit from the plurality of product conduits, wherein the plurality of filling valves are arranged on a carousel of a rotary filler;

ascertaining a filling product quantity passing through each product conduit from the plurality of product conduits via a flowmeter from a plurality of flowmeters connected to each product conduit, wherein each flowmeter from the plurality of flowmeters is connected to an associated filling valve from the plurality of filling valves via a product conduit; and controlling the plurality of filling valves during a filling process via a controller that communicates with the plurality of filling valves and with the plurality of flowmeters, wherein the controller is configured to control the plurality of filling valves during the filling process, communicates bidirectionally with each flowmeter from the plurality of flowmeters and performs a parameterization of each flowmeter from the plurality of flowmeters in a manner dependent on one or more filling process variables.

13. The method of claim 12, wherein the controller performs the parameterization of the each flowmeter from the plurality of flowmeters during the filling process.

14. The method of claim 12, wherein the controller performs the parameterization of the each flowmeter from the plurality of flowmeters during an introduction of the filling product into the container.

15. The method of claim 12, wherein a filling valve from the plurality of filling valves comprises a proportional valve, the one or more filling process variables comprises a control variable of the controller for control of the filling valve, and the control variable is a measure for a degree of opening of the filling valve that is to be set.

16. The method of claim 12, wherein a flowmeter from the plurality of flowmeters comprises an inductive type flowmeter, and at least one parameter to be adapted during the parameterization of the flowmeter comprises a frequency and/or a strength of an electromagnetic field, and/or a sampling rate.

17. The method of claim 12, wherein the parameterization of a flowmeter from the plurality of flowmeters comprises an adaptation of electronics of the flowmeter, and/or an adaptation of an algorithm for ascertaining and/or evaluating measurement data detected by the flowmeter.

18. The method of claim 12, wherein the filling product comprises a base liquid and at least one dosage component, and the method further comprises:

providing the base liquid via a base reservoir;

introducing the base liquid from a base reservoir into a dosing chamber of a base line;

introducing the at least one dosage component from a dosage branch of the base line into the dosing chamber of the base line, wherein, for dosed introduction of the dosage component, a flowmeter from the plurality of flowmeters determines the filling product quantity passing the flowmeter in a base conduit; and emptying the dosing chamber of the base line into a container via a filling valve from the plurality of filling valves.

19. The method of claim 12, wherein the one or more filling process variables comprise one or more filling product characteristics, and the one or more filling product characteristics comprise a viscosity of the filling product, a Brix content of the filling product, a fruit fiber content of the filling product, and/or a pulp content of the filling product.

\* \* \* \* \*